United States Patent [19]

Baumann

[11] Patent Number: 5,252,104
[45] Date of Patent: Oct. 12, 1993

[54] PRODUCTS OF REACTING AN ALKYLENE OXIDE WITH A CONDENSATE OF FORMALDE, AN ALKYLPHENOL AND AN AMINE

[75] Inventor: Hans-Peter Baumann, Ettingen, Switzerland

[73] Assignee: Sandoz Ltd., Basel, Switzerland

[21] Appl. No.: 753,473

[22] Filed: Sep. 3, 1991

[30] Foreign Application Priority Data

Sep. 5, 1990 [DE] Fed. Rep. of Germany ....... 4028097

[51] Int. Cl.$^5$ .................. C08G 14/12; D06P 1/60; D06P 1/613; D06P 3/60
[52] U.S. Cl. .......................... 8/554; 8/116.1; 8/606; 8/917; 8/918; 8/924; 252/8.7
[58] Field of Search ................ 8/554, 606; 252/8.7

[56] References Cited

U.S. PATENT DOCUMENTS

| | | | |
|---|---|---|---|
| 3,278,637 | 10/1966 | Kirkpatrick et al. | 252/344 |
| 3,606,988 | 9/1971 | Walz et al. | 8/560 |
| 3,802,895 | 4/1974 | Dahlgren et al. | 106/164 |
| 4,403,077 | 9/1983 | Uhrig et al. | 252/8.7 |
| 4,980,425 | 12/1990 | Uhrig et al. | 252/352 |
| 5,100,989 | 3/1992 | Uhrig et al. | 527/602 |

FOREIGN PATENT DOCUMENTS

| | | |
|---|---|---|
| 2-160898 | 6/1990 | Japan. |
| 2-160899 | 6/1990 | Japan. |
| 2041011 | 9/1980 | United Kingdom. |

*Primary Examiner*—A. Lionel Clingman
*Attorney, Agent, or Firm*—Robert S. Honor; Richard E. Vila; Thomas C. Doyle

[57] ABSTRACT

Products (E) obtainable by reaction of condensation products (K) of
(a) formaldehyde or a formaldehyde-yielding compound,
(b) at least one ($C_{1-5}$-alkyl)-phenol and
(c) at least one amine that contains at least two NH-groups that are reactive with formaldehyde, with the proviso that there are employed 1 mole (c) ±5 mole % and 1.6 to 2.4 moles of formaldehyde (a) or the corresponding amount of a formaldehyde-yielding compound (a) per mole of ($C_{1-5}$-alkyl)-phenol (b), with
(d) alkyleneoxide and optionally styreneoxide and optionally quaternization of the reaction product and/or modification thereof by introduction of at least one anionic group, or mixtures of such products are eminently suitable as dyeing assistants, in particular as levelling agents for the dyeing of hydrophilic cellulosic and/or polyamidic substrates with dyes of high affinity for the substrate.

47 Claims, No Drawings

PRODUCTS OF REACTING AN ALKYLENE OXIDE WITH A CONDENSATE OF FORMALDE, AN ALKYLPHENOL AND AN AMINE

In the dyeing of hydrophilic substrates (in particular of cellulose or of natural or synthetic polyamide material) with dyes of high affinity, e.g. substantivity, the dyes tend to build up very quickly and/or very firmly on the substrate and then practically not migrate any more on the substrate, so that unlevel dyeings may result. In order to avoid this unlevelness suitable dyeing assistants (in particular levelling agents and/or migration assistants) are employed in the dye-houses. When using dyestuffs of highest substantivity, e.g. direct dyes of the SDC-classification B and in particular C a sufficient levelness is often not achieved and/or the assistant must be used in such amounts that the dye is too strongly retarded and does no longer build up well or is highly agglomerated (e.g. until it coagulates) or there are e.g. used levelling agents that tend strongly to cause foam-formation (in particular such with long hydrocarbon chains in the molecule) and need the addition of further assistants (defoamers, e.g. on the basis of silicones and/or paraffins).

It has now been found that the products (E) defined below are surprisingly well suitable as dyeing assistants even without the addition of further adjuvants for the obtention of dyeings of outstanding levelness, in particular on substrates of cellulosic or polyamide material.

The invention relates to the defined products (E), their production and their use as dyeing assistants.

The invention, thus, provides a product (E) obtainable by reaction of a condensation product (K) of (a) formaldehyde or a formaldehyde-yielding compound, (b) at least one ($C_{1-5}$-alkyl)-phenol and (c) at least one amine that contains at least two NH-groups that are reactive with formaldehyde, with the proviso that there are employed 1 mole (c) ±5 mole % and 1.6 to 2.4 moles of formaldehyde (a) or the corresponding amount of a formaldehyde-yielding compound (a) per mole of ($C_{1-5}$-alkyl)-phenol (b), with (d) alkyleneoxide and optionally styreneoxide and optionally quaternization of the reaction product and/or modification thereof by introduction of at least one anionic group, or a mixture of such products.

As formaldehyde-yielding compound (a) paraformaldehyde is particularly suitable.

In the ($C_{1-5}$-alkyl)-phenols (b) the $C_{1-5}$-alkyl radicals may be linear (methyl, ethyl, n-propyl, n-butyl, n-amyl) or, if they contain 3 to 5 carbon atoms, also branched (isopropyl, iso-, sec.- or tert.-butyl, iso-, sec-. or tert.-amyl or neopentyl); among these are preferred those in which the alkyl radical contains 1 to 4 carbon atoms, in particular methyl-, ethyl-, n-propyl-, isopropyl-, sec.-butyl or tert.-butyl-phenols, among which isopropyl-phenols and especially cresols (before all ortho- or para-cresol) are particularly preferred.

As components (c) are particularly suitable those containing such an amount of amino-hydrogen atoms reactive towards formaldehyde that they can be methylolated with the employed quantity of (a). Preferably there are employed as (c) oligoamines containing at least two primary amino groups. With particular preference there are employed diamines of formula $$H_2N-Z-NH_2 \qquad (I),$$

wherein Z signifies a bivalent hydrocarbon radical that contains 2 to 15, advantageously 3 to 13, in particular 6 to 12 carbon atoms and is optionally interrupted by oxygen. As amines (c), especially those of formula (I), come, in particular, into consideration open-chain and/or cyclic aliphatic diamines, aromatic or alkylaromatic diamines or further amino-terminated oligopropyleneglycols (i.e. containing —$NH_2$ in place of —OH). Per mole of component (b) there are employed advantageously 0.98 to 1.02 moles of component (c), preferably 1 mole of component (c).

Per mole of component (b) there are employed preferably 1.7 to 2.0, particularly 1.8 to 2.0 moles of formaldehyde or the corresponding amount of a formaldehyde-yielding compound.

As component (d) come into consideration conventional alkyleneoxides, principally such with 2 to 4 carbon atoms, namely ethyleneoxide, propyleneoxide and butyleneoxide, as well as the above-mentioned styreneoxide, preferably at least 50 mole %, in particular at least 80 mole % of the employed alkyleneoxides being ethyleneoxide. When reacting with styreneoxide, there is preferably employed not more than 1 mole thereof per mole of reactive hydrogen of (K). Preferably there is exclusively employed ethyleneoxide as component (d). The degree of oxyalkylation is advantageously in the range of 10 to 100, preferably 30 to 50 oxyalkylene units, on average, per molecule of starting component (b), in particular so that all of the available reactive hydrogen atoms (phenolic ones, methylolic ones and residual amino hydrogens) are oxyalkylated. Preferably oxyalkylation is brought about with 10 to 100 moles of ethyleneoxide, in particular 30 to 50 moles of ethyleneoxide per mole of component (b).

The reaction of components (a), (b) and (c) is a condensation of the kind of the Mannich reactions and can be brought about by plain admixture of the components, whereby the reaction being exothermal the temperature of the reaction mixture increases to some extent. The reaction takes place advantageously in the temperature range of 40° to 120° C., preferably of 50° to 100° C. The reactants are advantageously mixed with each other at temperatures in the range from room temperature (=20° C.) to 70° C., preferably 40° to 60° C. and the reaction is advantageously completed at temperatures in the range of 90° to 100° C. The reaction-water formed during the condensation reaction may be eliminated, advantageously by evaporation respectively distillation, suitably under reduced pressure. By application of a stronger vacuum, such as can be produced with a water-jet suction pump (VENTURI-pump), the remaining reaction water and optionally also traces of non-reacted reagents may be eliminated from the reaction mixture. An elimination of these traces of non-reacted reagents is, however, not absolutely necessary, since in the further reaction of the product they practically do not impair the properties of the final product. The condensation products (K) are, in general, liquids that are viscous at room temperature, the viscosity of which clearly diminishes with increasing temperature. At 40° to 50° C. they are, in general, readily flowable. The viscosities at 50° C. are, principally, in the range of 25,000 to 500 mPa.s, preferably 10,000 to 1000 mPa.s.

The reaction with (d) may take place under conditions conventional per se, e.g. at temperatures in the range of 120° to 180° C. and in the presence of a alkali metal hydroxide as a catalyst, preferably potassium hydroxide, and optionally in the presence of an inert, aprotic solvent, e.g. a mono- or oligo-ethyleneglycol-di-($C_{1-4}$-alkyl)-ether; if styreneoxide is used this is preferably employed first and only thereafter the further alkyleneoxides, in particular, ethyleneoxide. Preferably there is employed no more than one mole of styreneoxide per mole of employed alkylphenol (b); with particular preference there is employed no styreneoxide.

The obtained reaction products ($E_1$) of (K) with (d) may be, if desired, be quaternized to quaternary derivatives ($E_2$). As quaternizing agents, therefor there may be employed conventional compounds, in particular as suitable for the introduction of corresponding $C_{1-4}$-alkyl radicals, benzyl radicals and/or carbamoylmethyl or carboxymethyl radicals, in particular dimethylsulphate, diethylsulphate, p-toluenesulphonic acid methylester, chloroacetamide, chloroacetic acid or benzyl chloride. The quaternization may, in particular, be carried out in aqueous medium at temperatures in the range of 60° to 120° C., preferably 70° to 100° C., suitably in the absence of oxygen.

For the production of ($E_2$) the available amino groups in the reaction products ($E_1$) may be quaternized fully or only in part. Per mole of amine (c) there are employed advantageously 0.5 to 2 moles, preferably 0.8 to 1.2 moles of quaternizing agent.

The above described reaction products ($E_1$) or their quaternization products ($E_2$) may, if desired, be anionically modified by introduction of anionic radicals. The corresponding anionically modified derivatives are indicated in the following with ($E_a$) [in particular with ($E_{a1}$) the anionically modified derivatives of ($E_1$) and with ($E_{a2}$) the anionically modified derivatives of ($E_2$)]. By the anionic modification there are in particular introduced radicals Y which contain an organic or inorganic acid group, optionally in salt form, especially a carboxy group, a sulphato group, a sulphonic acid group or a phosphato group. The introduction of the groups Y may take place in a manner known per se employing corresponding Y-yielding compounds. Suitable reagents for the introduction of these groups Y include, in particular, sulphuric acid, aminosulphonic acid, chlorosulphonic acid, epoxypropanesulphonic acid, phosphoric acid (preferably in the form of polyphosphoric acid, phosphorus oxychloride or phosphoric acid anhydride), maleic acid or a functional derivative thereof, e.g. maleic acid anhydride, or further chloroacetic acid. Particularly preferred among these is aminosulphonic acid. The reaction with these reagents introducing the radicals Y advantageously takes place at temperatures in the range of 40° to 130° C., preferably up to 100° C., when employing chloro-substituted products expediently in the presence of a suitable base, in particular an alkali metal hydroxide. The reaction with sulphuric acid or aminosulphonic acid is advantageously carried out in the presence of a sulphation adjuvant, preferably urea (e.g. 10 to 300% by weight of the acid), in particular at temperatures in the range of 60° to 100° C. After the reaction any free acid groups may, if desired, be transformed into the corresponding salt form by reaction with a base, in particular with an alkali metal hydroxide, ammonia or a low molecular amine (e.g. mono-, di- or triethanolamine or -isopropanolamine).

Of the reactable hydrogen atoms available for an anionic modification (in general the terminal hydroxy group of the respective polyglycolether chains) there may be reacted all or only a part thereof with the Y-yielding reagents. Per mole of the employed alkylphenol (b) there are employed advantageously 0.2 to 3, preferably 0.5 to 3, in particular 0.5 to 2 moles of the Y-yielding compound.

Among the products (E) of the invention, i.e. ($E_1$), ($E_2$), ($E_{a1}$) and ($E_{a2}$) the anionically modified products ($E_{a1}$) [i.e. the anionically modified derivatives of ($E_1$)] and ($E_{a2}$) [i.e. the anionically modified derivatives of ($E_2$)] are preferred, of which the products ($E_{a1}$) are particularly preferred. According to a further preferred variant the products ($E_a$) of the invention, in particular ($E_{a1}$), are blended with derivaties that are not anionically modified, namely ($E_1$) and/or ($E_2$) of which ($E_2$) is preferred; in the corresponding mixture ($E_a$) amounts advantageously to at least 20% by weight, in particular to 20 to 90% by weight. Such products (E) are, thus, preferred, in which the content of ($E_a$) is 20 to 100% by weight. Particularly preferred are ($E_{a1}$) and their mixtures with ($E_2$) advantageously in the weight ratio of 20/80 to 90/10.

The products (E) of the invention serve as assistants (in particular as levelling agents) in the dyeing of hydrophilic, cellulose- and/or polyamide-containing materials, optionally blended with hydrophobic fibres (e.g. polyester and/or elastomeric fibres), mainly with hydrosoluble in particular anionic dyes with a high affinity, especially substantivity, for the substrate.

As polyamide material come mainly into consideration the more hydrophilic fibrous materials, principally wool, silk and hydrophilic synthetic polyamide qualities (e.g. polyamide 6 and polyamide 66); as cellulosic materials come mainly into consideration the more hydrophilic fibrous materials (in particular cotton, linen, hemp, ramie and sisal); as blended fibrous material come mainly into consideration cotton/polyester blends. The substrates may be in any processing form as they are usually employed for corresponding dyeing processes, principally as loose fibres, yarns, filaments, woven or knitted goods, non-wovens, felts or half-ready-made or ready-made goods. The dyeing may be carried out according to any conventional method, in particular from aqueous/organic or preferably aqueous medium, advantageously by exhaust methods from short to long liquors (e.g. 2:1 to 100:1) or by impregnation (e.g. by padding, dipping, spraying, application by means of a rod or by printing, in particular in printing pastes or inks). As dyes there may be employed any conventional suitable dyes, in particular anionic hydrosoluble dyes with a high affinity for the substrate. For the dyeing of the hydrophobic portion of fibre-blends of hydrophobic and hydrophilic fibres there may be employed corresponding suitable dyes, principally disperse dyes. The process of the invention is particularly suitable for the dyeing of cellulose with dyes of high substantivity, in particular of the SDC-classification B and before all C, i.e. with such dyes which, due to their very high substantivity, tend per se very strongly to unlevel dyeing or in the liquor tend very strongly to agglomerating.

By the process of the invention it is possible by using the assistants (E) of the invention, in particular ($E_a$), to achieve very level dyeings, also with such very difficult dyes, in particular even under such dyeing condition that would otherwise favour unlevel dyeing as e.g. the dyeing in a relatively short dyeing duration and/or with a relatively short liquor and/or under high dynamic stress of the substrates and/or of the liquor.

The assistants (E) are advantageously employed in such quantities as are sufficient in order to obtain the desired effect; advantageously there are employed 0.2 to 3% by weight of (E) referred to the dry weight of the substrate. They are advantageously added to the respective liquor or paste before the substrate is brought into contact with the liquor or paste; they may, however, still be added to the dyeing liquor while this is heated, namely at temperatures that are advantageously ≦60° C. For the dyeing any conventional temperatures are suitable as would otherwise normally be employed, be they temperatures in the range of 15° to 40° C. (e.g. for impregnation with subsequent cold dwelling process( or up to 100° C. (e.g. for the dyeing by the exhaust method) or temperatures above 100° C., e.g. up to 140° C. for HT-processes or further, upon impregnation, temperatures above 100° C. for fixation, e.g. by steaming (102° to 110° C.) or thermosoling (e.g. at 130° to 180° C.). The pH-values may be kept in the ranges as usual for the respective dyes, substrates and dyeing methods, e.g. at pH 4 to 8.

Using the assistants (E) of the invention there may be achieved on the respective substrates very level dyeings, even when using dye mixtures (e.g. also trichromatic mixtures), in particular on cellulosic substrates, the assistants (E) of the invention, in particular ($E_a$), further being distinguished by their disagglomerating activity and pronounced non-specificity with respect to the dyes. There may be obtained dyeings of very high yield and optimum fastnesses. The tendency to foam-formation in the liquor is minimal or even absent. The products (E) of the invention are readily hydrosoluble and are advantageously handled in the form of concentrated aqueous compositions, in particular such, in which the (E)-content is in the range of 5 to 60% by weight, preferably 20 to 50% by weight. The aqueous compositions excel by their outstanding storage stability even under various temperature conditions, e.g. as well under conditions of frost as under conditions of heat (e.g. at temperatures below $-10°$ C. or above $+40°$ C.). The presence of any by-products and/or assistants (e.g. of the mentioned solvents and/or sulphation adjuvants) from the production of (E)-as indicated above-does not impair the activity of (E).

In the following examples parts and percentages are by weight, the temperatures are in degrees Celsius.

EXAMPLE 1

α) Production of the product ($E_{11}$)

In a suitable vessel 116 parts of hexamethylenediamine and 108.1 parts of orthocresol are mixed with each other, heated to 60° C. and portionwise treated with 54 parts of paraformaldehyde. The at first increasing temperature is maintained at 99° C. for 5 hours with stirring and reflux cooling. The reflux condenser is then replaced by a dephlegmator condenser and then the major portion of the water present is distilled off at 80° C. applying a slight vacuum. The vacuum is then increased (water-jet suction pump) and the water still present is distilled off (together with traces of non-reacted cresol and/or amine). For oxyethylation 2.5 parts of potassium hydroxide are introduced into the vessel, the vessel is heated to 130°-140° C., evacuated, the vacuum released with nitrogen, the content of the vessel further heated to 160°-170° C. and reacted in conventional way with 1320 parts of ethyleneoxide.

β) Quaternization of ($E_{11}$) to a product ($E_{21}$)

The product ($E_{11}$) obtained as described above is rinsed with nitrogen in the same vessel and heated to 85° C., 126 parts of dimethylsulphate are added very slowly thereto, then the mixture is further heated to 95° C. and stirred for 5 hours. Upon cooling to 80° C., it is treated with 2541.3 parts of demineralized water, stirred for 15 minutes and cooled to ambient temperature. There is obtained a 40% solution of the product ($E_{21}$) (which corresponds to Example 5 below).

γ) Esterification of ($E_{11}$) with aminosulphonic acid to a product ($E_{a11}$)

The product ($E_{11}$) obtained according to the above Example α is heated, together with 388 parts of urea, to 100° C. and slowly treated with 194 parts of aminosulphonic acid with stirring and stirred for further 5 hours after conclusion of the aminosulphonic acid addition at 90°-100° C. The obtained product ($E_{a11}$) corresponds to Example 6.

δ) Esterification with aminosulphonic acid to a product ($E_{a21}$)

The procedure according to γ is repeated with the difference that in place of the product ($E_{11}$) there is employed the product ($E_{21}$) obtained in the above Example β.

δbis) By replacing in Example 1γ the 194 part of aminosulphonic acid by 429 parts thereof and the 388 parts of urea by 630 parts thereof, there is obtained a correspondingly higher sulphated (fully sulphated) product.

In the following Table are indicated further products (E) that can be obtained analogously as described in Example 1 and that are characterized by the reagents and molar ratios indicated in the respective columns as follows: the alkylphenol (b) (1 mole), the amine (c) (1 mole), the number of moles of formaldehyde (a) (employed as paraformaldehyde), the number of moles of styreneoxide ($d_1$), the number of moles of ethyleneoxide ($d_2$), the Y-yielding agent and the employed number of moles thereof, and the number of moles of dimethylsulphate (q).

The reaction with chloroacetic acid in Examples 41 and 42 is carried out without addition of urea, in the presence of sodium hydroxide, at 50° C.; th reaction with $P_2O_5$ in Examples 30, 39, 40 and 43 is carried out without addition of urea, at 45° C., followed by the addition of sodium hydroxide for salt formation.

TABLE 1

| Ex. No | (b) 1 mole | (c) 1 mole | (a) | ($d_1$) | ($d_2$) | Y-yielding agent (moles) | | (q) |
|---|---|---|---|---|---|---|---|---|
| 2 | p-Cresol | Hexamethylenediamine | 1.8 | — | 20 | — | | 1 |
| 3 | " | " | 1.8 | — | 30 | Aminosulphonic acid | (2) | — |
| 4 | " | " | 1.8 | — | 30 | Aminosulphonic acid | (2) | 1 |
| 5 | o-Cresol | " | 1.8 | — | 30 | Aminosulphonic acid | (2) | — |
| 6 | " | " | 1.8 | — | 30 | — | | 1 |
| 7 | " | " | 1.8 | — | 50 | — | | — |
| 8 | " | " | 1.8 | — | 35 | Aminosulphonic acid | (3) | — |
| 9 | 2-sec.-Butyl-phenol | " | 2.0 | — | 30 | — | | |
| 10 | 2-tert.-Butyl-phenol | " | 1.8 | — | 10 | Aminosulphonic acid | (3) | 1 |
| 11 | " | " | 1.8 | — | 30 | Aminosulphonic acid | (2) | |
| 12 | " | " | 1.8 | — | 50 | — | | 1 |

TABLE 1-continued

| Ex. No | (b) 1 mole | (c) 1 mole | (a) | (d₁) | (d₂) | Y-yielding agent | (moles) | (q) |
|---|---|---|---|---|---|---|---|---|
| 13 | 4-tert.-Butyl-phenol | " | 1.8 | — | 20 | Aminosulphonic acid | (2) | 1 |
| 14 | p-tert.-Amyl-phenol | " | 1.8 | — | 50 | Aminosulphonic acid | (0.5) | — |
| 15 | 2-Isopropyl-phenol | " | 1.8 | — | 30 | Aminosulphonic acid | (3) | — |
| 16 | 2-sec.-Butyl-phenol | " | 1.8 | — | 30 | Aminosulphonic acid | (1) | 1 |
| 17 | o-Cresol | α,α'-Diamino-m-xylene | 1.8 | — | 30 | Aminosulphonic acid | (2) | — |
| 18 | " | " | 1.8 | — | 35 | — | | 1 |
| 19 | p-Cresol | 1,4-Diamino-cyclohexane | 1.8 | — | 30 | Aminosulphonic acid | (2) | — |
| 20 | " | " | 1.8 | — | 35 | — | | 1 |
| 21 | " | Dodecamethylenediamine | 1.8 | — | 30 | Aminosulphonic acid | (2) | — |
| 22 | " | " | 1.8 | — | 30 | — | | 1 |
| 23 | " | " | 1.8 | — | 50 | — | | — |
| 24 | " | $H_2N{+}C_3H_6O{\mathchar"717D}_{\overline{n}}C_3H_6{-}NH_2$* | 1.8 | — | 20 | — | | — |
| 25 | " | " | 1.8 | — | 30 | — | | 1 |
| 26 | " | " | 1.8 | — | 60 | — | | 1 |
| 27 | " | " | 1.8 | — | 50 | — | | — |
| 28 | " | 1,2-Phenylenediamine | 1.8 | — | 30 | Aminosulphonic acid | (2) | 1 |
| 29 | " | " | 1.8 | — | 30 | — | | 1 |
| 30 | o-Cresol | Hexamethylenediamine | 1.8 | — | 30 | $P_2O_5$ | (1) | — |
| 31 | p-Cresol | Propylenediamine | 1.8 | — | 35 | Aminosulphonic acid | (2) | — |
| 32 | " | TCD-Diamine** | 1.8 | — | 30 | Aminosulphonic acid | (2) | — |
| 33 | " | " | 1.8 | — | 30 | — | | — |
| 34 | o-Cresol | " | 2.0 | 1 | 30 | Aminosulphonic acid | (2) | 1 |
| 35 | " | Hexamethylenediamine | 1.8 | 1 | 35 | Aminosulphonic acid | (2) | 1 |
| 36 | " | " | 1.8 | 1 | 30 | — | | 1 |
| 37 | " | 4,4'-Diaminodiphenylmethane | 1.8 | — | 50 | — | | 1 |
| 38 | " | " | 1.8 | — | 100 | — | | — |
| 39 | o-Cresol | Hexamethylenediamine | 1.8 | — | 30 | $P_2O_5$ | (2) | — |
| 40 | " | " | 1.8 | — | 30 | $P_2O_5$ | (2) | 1 |
| 41 | " | " | 1.8 | — | 30 | Chloroacetic acid | (2) | — |
| 42 | " | " | 1.8 | — | 30 | Chloroacetic acid | (2) | 1 |
| 43 | " | " | 1.8 | — | 30 | $P_2O_5$ | (0.5) | — |

*Commercially available diamine mixture (BASF) n ≈ 2.6
**Commercially available diamine mixture of formula

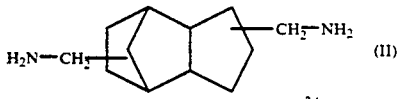

3(4).8(9)-Bis-(aminomethyl)-tricyclo-[5,2,1,0^{2,6}]-decane.

The following Table 2 contains mixtures of products (E)

TABLE 2

| Ex. No | Product (E_a) according to Example | (%) | Product (E_{a1}) or (E_{a2}) according to Example | (%) |
|---|---|---|---|---|
| 44 | 5 | (80) | 6 | (20) |
| 45 | 5 | (50) | 6 | (50) |
| 46 | 5 | (20) | 6 | (80) |
| 47 | 32 | (50) | 33 | (50) |
| 48 | 15 | (30) | 6 | (70) |
| 49 | 30 | (40) | 6 | (60) |
| 50 | 5 | (50) | 1α | (50) |

LIQUID FORMULATIONS

The products of the above Examples-where they are not already obtained in the form of aqueous formulations of 40% concentration as Example 1β-are diluted with demineralized water to an (E)-content of 40%.

DYEING EXAMPLE 1

0.2 parts of the dye Colour Index Direct Blue 251 (in the 240% commercial form) are dissolved in 4000 parts of softened water at 40° C., together with 2 parts of the assistant ($E_{a11}$) according to Example 1γ (liquid form of 40% concentration) and 8 parts of Glauber's salt (sodium sulphate). 100 parts of pre-wetted cotton fabric is introduced into the bath and heated during 30 minutes to boiling temperature. The bath is maintained during 1 hour at boiling temperature, the evaporating water being replaced from time to time. Then the dyed material is taken out from the liquor, rinsed with water and dried. The dye builds up practically quantitatively on the fibre; the dye-bath is nearly colourless. There is obtained a perfectly level blue dyeing of good light-fastness and wet-fastnesses.

DYEING EXAMPLE 2

Cross-wound bobbins of worsted woll yarn are treated at a liquor-to-goods ratio of 15:1, during 7 minutes, at 50° C., with an aqueous liquor containing per liter 2 g of calcined Glauber's salt (sodium sulphate), 1 g of glacial acetic acid and 0.66 g of the assistant ($E_{a11}$) according to Example 1γ (liquid form of 40% concentration).

The temperature is raised during 15 minutes to 100° C. and there are added 0.5 g of the dye Colour Index Acid Blue 126 per liter of liquor. Dyeing is carried out during 60 minutes at 100° C.; after the conclusive rinsing and drying there is obtained an excellently level, very fast blue dyeing.

Analogously as the assistant ($E_{a11}$) there are employed in the Dyeing Examples 1 and 2 the assistants of the Examples 1α, 1β, 1δ, 1γbis and 2 to 50.

I claim:

1. A product (E) obtainable by reaction of a condensation product (K) of
   (a) formaldehyde or a formaldehyde-yielding compound,
   (b) at least one ($C_{1-5}$-alkyl)-phenol and
   (c) at least one amine that contains at least two NH-groups that are reactive with formaldehyde, with the proviso that there are employed 1 mole±5 mole % (c) and 1.6 to 2.4 moles of formaldehyde (a) or the corresponding amount of a formaldehyde-yielding compound (a) per mole of ($C_{1-5}$-alkyl)-phenol (b), with (d) alkylene oxide and optionally styreneoxide and optionally quaternization of the reaction product and/or modification thereof by introduction of at least one anionic group, or a mixture of products (E).

2. A product (E) or mixture thereof according to claim 1 wherein (K) is a condensation product of a ($C_{1-4}$-alkyl)-phenol, hexamethylenediamine and (a) in the molar ratio 1:1:(1.8 to 2.0 moles of formaldehyde or the corresponding amount of a formaldehyde-yielding compound).

3. A product (E) or mixture thereof according to claim 1, wherein per mole of (b) there are employed 10 to 100 moles of (d) with the proviso that at least 50 mole % of the alkylene oxide is ethylene oxide.

4. A product (E) according to claim 1, which is a product ($E_a$) that is obtained by modification with at least one anionic group Y.

5. A product ($E_a$) according to claim 4, wherein the anionic group is a sulpho group optionally in salt form.

6. A product (E) according to claim 1, which is quaternized.

7. A product (E) according to claim 6, which is a quaternization product ($E_2$) of a reaction product ($E_1$) of (K) and (d).

8. A mixture of products (E) according to claim 1, comprising a product ($E_a$) that is obtained by modification with at least one anionic group Y.

9. An aqueous concentrated composition comprising a product (E) or mixture thereof, as defined in claim 1.

10. An aqueous composition according to claim 9, in which the content of (E) or mixture thereof is 5 to 60% by weight.

11. A process for the dyeing of hydrophilic cellulosic and/or polyamide containing substrates, with hydrosoluble dyes, wherein a product (E) or mixture thereof according to claim 1 is employed as an assistant.

12. A process according to claim 11 for the dyeing of cellulosic textile material with direct dyes of the SDC-classification B and/or C.

13. A process according to claim 11, wherein (E) or a mixture thereof is employed in a concentration of 0.2 to 3% by weight, referred to the dry weight of the substrate.

14. A process according to claim 11 wherein (E) or a mixture thereof is employed in the form of an aqueous composition.

15. A process for the production of a product (E) according to claim 1, which comprises reacting a condensation product (K) of (a) formaldehyde or a formaldehyde-yielding compound, (b) at least one ($C_{1-5}$-alkyl)-phenol and (c) at least one amine that contains at least two NH-groups that are reactive with formaldehyde, with the proviso that there are employed 1 mole±5 mole % (c) and 1.6 to 2.4 moles of formaldehyde (a) or the corresponding amount of a formaldehyde-yielding compound (a) per mole of ($C_{1-5}$-alkyl)-phenol (b), with (d) alkylene oxide and optionally styrene oxide.

16. A process according to claim 15 which further comprises quaternizing and/or modifying, by the introduction of at least one anionic group, the product of reacting (K) with (d).

17. A process according to claim 16 wherein the introduction of at least one anionic group is carried out with aminosulphonic acid.

18. A product (E) or mixture thereof, according to claim 1 wherein there is employed 1 mole of (c) per mole of (b).

19. A product (E) selected from the group consisting of ($E_1$) A product obtainable by reacting a condensation product (K) of (a) formaldehyde or a formaldehyde-yielding compound, (b) at least one ($C_{1-5}$-alkyl)-phenol and (c) at least one amine that contains at least two NH-groups that are reactive with formaldehyde, with the proviso that there are employed 0.95 to 1.05 moles of (c) and 1.6 to 2.4 moles of formaldehyde (a) or the corresponding amount of formaldehyde-yielding compound (a) per mole of ($C_{1-5}$-alkyl)-phenol (b), with (d) alkylene oxide and optionally styrene oxide, ($E_2$) a product obtainable by quaternizing a product ($E_1$), ($E_{a1}$) a product obtainable by modifying ($E_1$) by introduction of at least one anionic group, and ($E_{a2}$) a product obtainable by modifying ($E_2$) by introduction of at least one anionic group, or a mixture of products (E).

20. A product according to claim 19 wherein (a) is formaldehyde or paraformaldehyde, (b) is a ($C_{1-4}$-alkyl)-phenol and (c) is a compound of the formula $H_2N$-Z-$NH_2$ wherein Z is a bivalent hydrocarbon radical which contains 2 to 15 carbon atoms and is optionally interrupted by oxygen and the alkylene oxide of (d) is ethylene oxide, propylene oxide or butylene oxide and the degree of oxyalkylation is in the range 10 to 100 oxyalkylene units on average per molecule of starting component (b).

21. A product according to claim 20 wherein not more than 1 mole of styrene oxide is employed per mole of reactive hydrogen in (K).

22. A product according to claim 20 wherein (d) is exclusively ethylene oxide.

23. A product according to claim 22 wherein, per mole of (b) there are employed 0.98 to 1.02 moles of (c) and 1.7 to 2.0 moles of formaldehyde or the corresponding amount of paraformaldehyde.

24. A product according to claim 20 wherein, per mole of (b) there are employed 0.98 to 1.02 moles of (c) and 1.7 to 2.0 moles of formaldehyde or the corresponding amount of paraformaldehyde.

25. A product according to claim 24 wherein (b) is isopropylphenol or cresol and (c) is selected from open chain and/or cyclic aliphatic diamines, aromatic diamines, alkylaromatic diamines and amino-terminated oligopropylene glycols.

26. A product according to claim 24 wherein the introduction of at least one anionic group is carried out using sulphuric acid, aminosulphonic acid, chlorosulphonic acid, epoxypropanesulphonic acid, phosphoric acid, maleic acid, maleic anhydride or chloroacetic acid.

27. A product according to claim 20 wherein the introduction of at least one anionic group is carried out using sulphuric acid, aminosulphonic acid, chlorosulphonic acid, epoxypropanesulphonic acid, phosphoric acid, maleic acid, maleic anhydride or chloroacetic acid.

28. A product (E) according to claim 1 obtainable by reacting (K) with not more than one mole of styrene oxide per mole of alkylphenol (b) and wherein the degree of oxyalkylation is in the range 10 to 100 oxyalkylene units per mole of starting component (b).

29. A product (E) according to claim 28 wherein the alkylene oxide (d) is ethylene oxide, propylene oxide or butylene oxide.

30. A product (E) according to claim 29 wherein at least 80% of the employed alkylene oxide is ethylene oxide.

31. A product (E) according to claim 30 wherein amine (c) is a compound of the formula $H_2H$-Z-$NH_2$, wherein Z is a bivalent hydrocarbon radical which contains 3 to 13 carbon atoms and is optionally interrupted by oxygen.

32. A product according to claim 29 wherein there are employed 0.98 to 1.02 moles of (c) and 1.8 to 2.0 moles of formaldehyde or the corresponding amount of formaldehyde-yielding compound (a) per mole of (b).

33. A product (E) according to claim 28 wherein the amine (c) is an oligoamine containing at least two primary amino groups.

34. A product (E) according to claim 28 which is obtainable by reacting (K) with (d) at a temperature in the range 120° to 180° C. wherein (K) is a product of condensing (a), (b) and (c) at a temperature in the range 40° to 120° C.

35. A product (E) according to claim 1 wherein amine (c) is a compound of the formula $H_2N$-Z-$NH_2$ wherein Z is a bivalent hydrocarbon radical which contains 2 to 15 carbon atoms and is optionally interrupted by oxygen.

36. A product ($E_{a1}$) according to claim 19.

37. A product ($E_{a1}$) according to claim 20 obtainable by modifying ($E_1$) with radicals Y which contain an organic or inorganic acid group, there being employed 0.2 to 3 moles of a Y-yielding compound per mole of alkylphenol (b) used to produce ($E_1$).

38. A product ($E_{a1}$) according to claim 37 wherein the Y-yielding compound is sulphuric acid, aminosulphonic acid, chlorosulphonic acid, epoxypropanesulphonic acid, phosphoric acid, maleic acid, maleic anhydride or chloroacetic acid.

39. A product according to claim 37 wherein at least 80% of the alkylene oxide (d) is ethylene oxide.

40. A product according to claim 39 wherein (d) comprises not more than one mole of styrene oxide per mole of alkylphenol (b).

41. A product according to claim 37 wherein there are employed 0.98 to 1.02 moles of (c) and 1.8 to 2.0 moles of formaldehyde or the corresponding amount of a formaldehyde-yielding compound (a) per mole of (b).

42. A process for dyeing a hydrophilic cellulose- and/or polyamide-containing material which comprises dyeing said material from an aqueous or aqueous/organic medium containing an anionic water-soluble dye suitable for dyeing the material and a dye leveling-effective amount of a compound (E) according to claim 19 based on the dry weight of the material.

43. A process according to claim 42 wherein the material is cellulose.

44. A process according to claim 43 wherein the dye is a direct dye of SDC classification B or C.

45. A process according to claim 42 wherein the compound (E) is a compound ($E_{a1}$).

46. A process according to claim 45 wherein the compound ($E_{a1}$) is a product of reacting (d) with (K) the condensation product of a ($C_{1-4}$-alkyl)-phenol, hexamethylene diamine and (a) in the molar ratio of 1:1:(1.8 to 2.0 moles of formaldehyde or the corresponding amount of a formaldehyde-yielding compound).

47. A process for dyeing a hydrophilic cellulose- and/or polyamide-containing material which comprises dyeing said material from an aqueous or aqueous/organic medium containing an anionic water-soluble dye suitable for dyeing the material and 0.2 to 3% of a compound ($E_{a1}$) according to claim 41.

* * * * *